United States Patent [19]

Haneda

[11] Patent Number: 4,731,748
[45] Date of Patent: Mar. 15, 1988

[54] POCKET COMPUTER WITH MEANS FOR CHECKING THE DETACHABLE MEMORY MODULE BEFORE AND AFTER POWER INTERRUPTION

[75] Inventor: Isamu Haneda, Nara, Japan
[73] Assignee: Sharp Kabushiki Kaisha, Osaka, Japan
[21] Appl. No.: 800,142
[22] Filed: Nov. 20, 1985
[30] Foreign Application Priority Data
Nov. 20, 1984 [JP] Japan .................. 59-246717
[51] Int. Cl.⁴ .......................................... G06F 7/04
[52] U.S. Cl. ................................................ 364/900
[58] Field of Search ... 364/200 MS File, 900 MS File; 371/12, 13, 21, 66; 380/23, 25

[56] References Cited

U.S. PATENT DOCUMENTS

| | | | |
|---|---|---|---|
| 4,400,783 | 8/1983 | Locke, Jr. et al. | 364/900 X |
| 4,564,922 | 1/1986 | Muller | 364/900 |
| 4,584,663 | 4/1986 | Tanikawa | 371/21 X |

FOREIGN PATENT DOCUMENTS 2101370  6/1981  United Kingdom .

Primary Examiner—Gary V. Harkcom
Assistant Examiner—David L. Clark
Attorney, Agent, or Firm—Birch, Stewart, Kolasch & Birch

[57] ABSTRACT

An electronic apparatus such as a pocket computer is of the type in which a detachable memory module can be operatively coupled. Just upon interruption of power, the apparatus generates indefinite information such as random number, time information, or the serial number, so that the indefinite information is written into both the memory module and a memory of the body of the computer. Just upon application of power, the apparatus reads the indefinite information out of the memory of the body of the computer and of a memory module presently coupled to the body to determine whether they agree with each other. Only when they agree with each other, the memory module presently coupled to the body of the apparatus will become effective.

6 Claims, 3 Drawing Figures

POCKET COMPUTER WITH MEANS FOR CHECKING THE DETACHABLE MEMORY MODULE BEFORE AND AFTER POWER INTERRUPTION

BACKGROUND OF THE INVENTION

The present invention relates to an electronic apparatus and, more particularly, to a detachable memory module for an electronic apparatus such as a pocket computer.

An electronic apparatus such as a pocket computer comprises a memory slot in which a detachable memory module can be operatively coupled. Such a memory module stores a program and data.

Assuming that the pocket computer is not powered after the memory module has been coupled to the computer, so that a new memory module is to be coupled, and thereafter, the computer is powered again, the computer may cause malfunction because of the replacement of a memory module. To solve such a problem, the computer must check, upon application of power, whether it has the same memory module as the memory module which was coupled before the power was interrupted. To really do such an identification of the module, it may be possible that the same identification name is registered in both the computer and the memory module. It is rather troublesome because the operator must input the name.

SUMMARY OF THE INVENTION

Accordingly, it is an object of the present invention to provide an improved electronic apparatus for automatically identifying memory modules operatively coupled thereto before interruption of power and after application of power.

It is another object of the present invention to provide an improved electronic apparatus for automatically inputting indefinite information into both a memory module and the body of the apparatus upon interruption of power, and automatically determining, upon application of power, whether the values of the indefinite information from both the memory module and the body are the same, so that only when they agree to each other, the memory module presently coupled to the apparatus becomes effective.

Briefly described, in accordance with the present invention, an electronic apparatus such as a pocket computer is of the type in which a detachable memory module can be operatively coupled. Upon interruption of power, the apparatus generates indefinite information such as random number, time information, or the serial number, so that the indefinite information is written in both a memory module and a memory of the body of the computer. Upon application of power, the apparatus controls so that the indefinite information is read out of the memory of the body and a memory module presently coupled to the body to determine whether they agree to each other or not. Only when they agree to each other, the memory module presently coupled to the body of the apparatus becomes effective.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
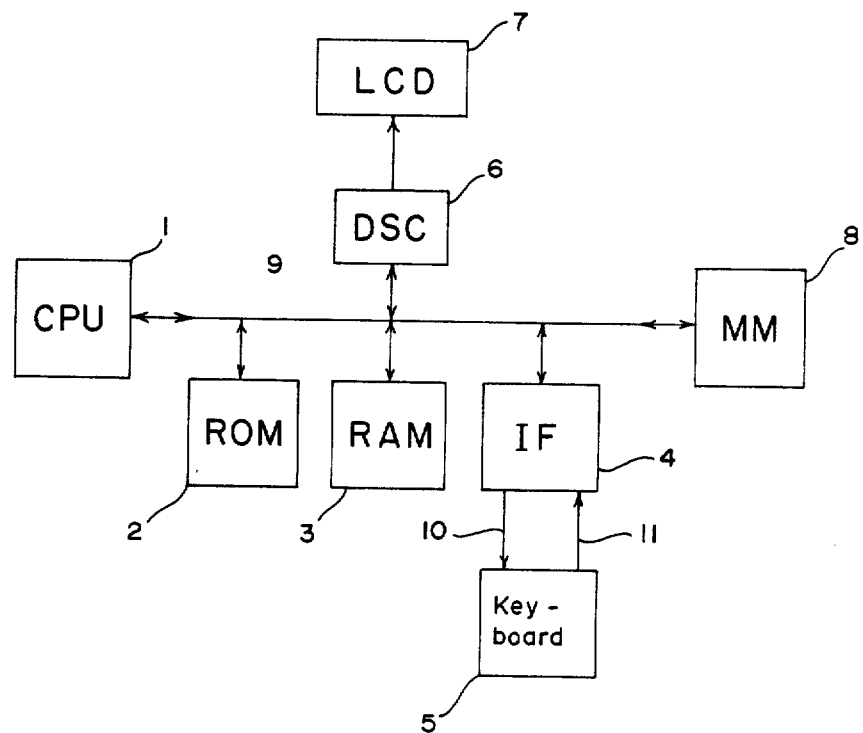
FIG. 1 is a block diagram of a pocket computer according to the present invention.

FIG. 1 shows a block diagram of an electronic apparatus of the present invention. By way of example, the electronic apparatus is referred to as a pocket computer although not limited thereto.

Referring to FIG. 1, the body of the pocket computer comprises a Central Processing Unit (CPU) 1 to which there are connected a Read Only Memory (ROM) 2, a Random Access Memory (RAM) 3, an interface Large Scale Integrated Circuit (LSI) 4, a display memory 6, and a memory module 8 through a CPU bus 9. The memory module 8 is detachably and operatively coupled to a memory slot in the body of the pocket computer. The memory module may comprise an RAM, an ROM, or an ROM/RAM for storing a program and data.

The ROM 2 stores a control program for the system of the computer, and a interpreter for BASIC. The RAM 3 stores a program written in BASIC, serves as a word area of the CPU 1, and a calculation register, and a random number register as a data area for storing indefinite information used for the present invention. The interface LSI 4 is provided for interfacing between the CPU 1 and an external input device such as a keyboard 5. The interface LSI 4 provides a signal 10 for key strobe signal, and receives a counter signal 11 from the keyboard 5. The display memory 6 serves as a display buffer, so that when display data is written in the display memory 6, the contents of the display data can be displayed in a display 7 such as a liquid crystal display (LCD).

The pocket computer stores the location information of the program and data stored within the detachable memory module when the program execution with the memory module, and, when stopping the program execution, it stores the address in a built-in memory in the main body.

Figure 2:
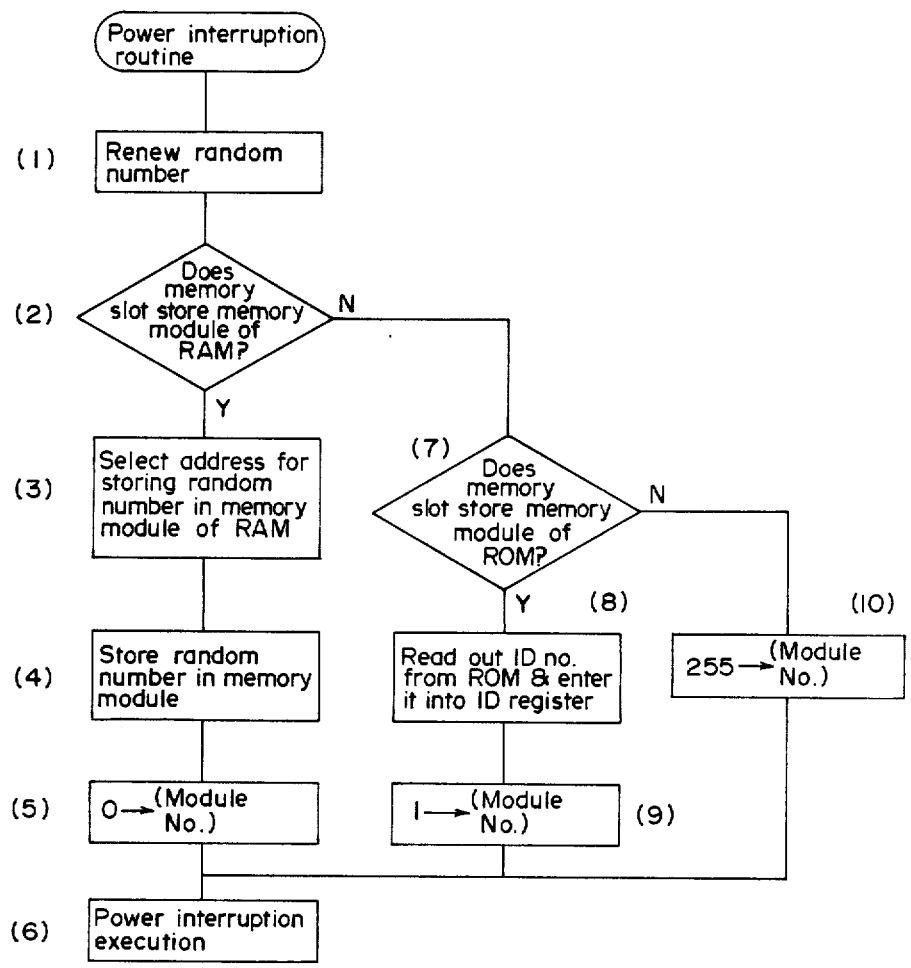
FIG. 2 shows a flow chart of the operation of a CPU in the pocket computer upon interruption of power.

FIG. 2 shows a flow chart of the operation of the CPU 1 upon interruption of power. The ROM 2 stores the program to execute the operation of FIG. 2. The power to the computer can be interrupted according to an instruction. While the power is being interrupted, the contents of the RAM 3 can be reserved.

Step (1): When the CPU 1 starts to execute a power interruption routine, the computer generates a new random number which is stored into the calculation register alotted within the RAM 3.

Step (2): It is detected whether an RAM as the memory module is inserted into the slot. When the RAM of the memory module is coupled, step (3) is selected. Otherwise, step (7) is selected.

Step (3): The address of the RAM of the memory module to which the random number is written in is selected. Possibly, the memory module may comprise a 4K or 8K byte memory. This step is executed to select an address for storing the random number depending upon the type of the memory module.

Step (4): The value of the random number obtained at step (1) is stored into the address selected in step (3).

Step (5): A code "0" is provided which represents that the memory module comprises a RAM. This code is stored into a particular register in the RAM 3 which is referred to as a "module no.".

Step (6): The power to the computer is interrupted.

Step (7): When it is detected in step (2) that the memory slot does not contain any memory memory consisting of an RAM, it is secondary detected whether it contains an ROM as the memory module. If there is, step (8) is selected. Otherwise, step (10) is selected.

Step (8): The ROM of the memory module is identified as a particular serial number referred to as an "Identification (ID) No.". The contents of the ID No. are read out so that they are stored into a particular register referred to as an "ID register" in the RAM 3. The contents of the ID register are used to check whether upon application of power, the memory slot has the same memory module as the memory module which was coupled just before interruption of power.

Step (9): A code "1" is inputted into the module No. to indicate that the memory module consists of a ROM.

Step (10): When no memory module is stored in the memory slot, a code "255" is inputted into the module no. to indicate this situation.

Since the calculation register must not be used for calculation just upon power interruption and just upon application of power, the calculation register may possibly serve additionally as the module No., the ID No., and the random number storage area.

Figure 3:
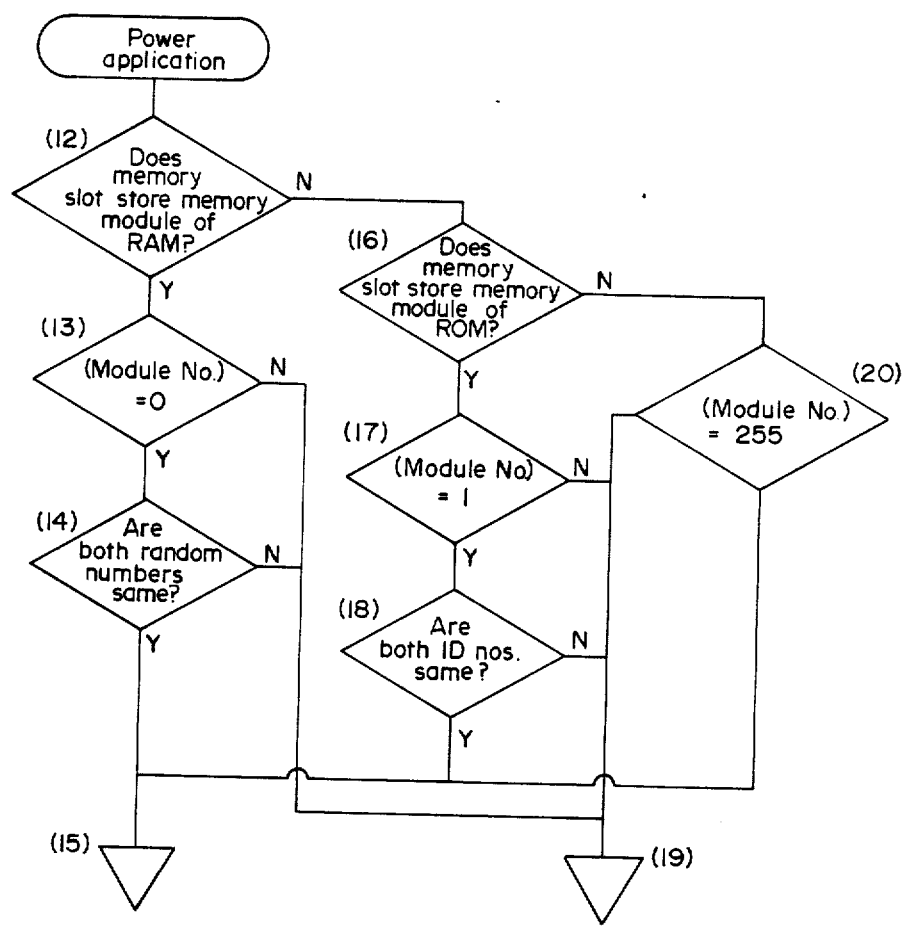
FIG. 3 is a flow chart of the operation of the CPU upon application of power.

FIG. 3 is a flow chart of the operation of the CPU 1 upon application of power. The ROM 2 stores a program for the operation of this flow chart. Upon application of power, the following steps are executed:

Step (12): Upon application of power, it is detected whether the memory module consisting of an RAM is inserted. If no RAM memory module, step (16) is selected.

Step (13): It is detected whether just before power interruption, the memory module consisting of an RAM has been inserted within the memory slot. If the module no. is "0", it is determined that the memory slot stores the RAM mememory module just before power interruption. Otherwise, step (19) is advanced.

Step (14): It is detected whether the contents of the random number stored within the calculation register in the RAM 3 coincide with the contents of the random number in the particular address of the memory module. If they agree with each other, it can be assumed that the same memory module is installed just before power interruption and just after power application. Otherwise, step (19) is selected.

Step (15): When the same memory module is inserted within the memory slot just before power interruption and just after power application, the subsequent steps are selected.

Step (16): It is detected whether the memory slot has a memory module consisting of an ROM. If not, step (20) is selected.

Step (17): Since the memory slot contains a memory module consisting of an ROM, it is detected whether the same memory module of ROM has been inserted within the memory slot just before power interruption. In this step, it is detected whether the module No. is "1". If not, step (19) is selected.

Step (18): When the module No. is "1", the ID No. of the memory module is compared with the ID No. stored in the ID register. If they coincide with each other, it can be correctly assumed that the ROM memory module in the memory slot is the same as the ROM memory module just before power interruption. When they do not coincide with each other, step (19) is selected.

Step (19): Because the condition of the memory slot is different between power interruption and power application, the corresponding routine is selected. In the steps following step (19), the access to the presently coupled memory module is prohibited.

Step (20): Since the memory slot does not contain any memory module, it is detected whether the same condition occured just before power interruption. This detection can be done by detecting whether the module No. is "255". If it is not "255", it can be assumed that the module No. is taken out just after power interruption and just before power application, to thereby select step (19).

In the operation of step (15), the program as stored in the memory module can be directly executed. As the operation of step (19), in addition to the case of prohibiting the access to the memory module presently coupled, a message can be displayed indicating that the memory module has been changed.

According to the present invention, it can be automatically detected whether the memory module coupled just before power interruption is coupled to the memory slot just after power application. In the above description, the random number as the indefinite information is exemplified. In place of the random number, time information can be used in which case the current time information provided by a timekeeping circuit just upon power interruption is stored into the computer and the memory module. Further, the serial number can be used as the indefinite information in which case a particular counter is provided in the computer and the memory module. Upon power interruption, the counter is advanced by "+1".

While only certain embodiments of the present invention have been described, it will be apparent to those skilled in the art that various changes and modifications may be made therein without departing from the sprit and scope of the present invention as claimed.

What is claimed is:

1. An electronic apparatus having detachable memory module means, said memory module means including at least two memories, each capable of being connected to said apparatus, said apparatus having only one of said at least two memories connected thereto, said apparatus further comprising:

means for detecting a power failure to said apparatus and for generating a failure signal;

means for generating information which is unique at the time of said power failure, in response to said failure signal;

write means for receiving said information and writing said information into both a memory area of said apparatus and a memory area of said memory module means;

means for detecting power resumption to said apparatus and for generating a resumption signal in response to said power resumption detection;

comparison means for comparing contents of said memory area of said apparatus and said memory area of said memory module means in response to said resumption signal, said means for comparing generating one of a coincidence signal and a noncoincidence signal, said coincidence signal indicating that said information stored in said memory area of said apparatus is identical to said information stored in said memory area of said memory module means connected to said apparatus, said noncoincidence signal indicating said information stored in said memory area of said apparatus is not identical to said information stored in said memory area of said memory module means connected to said apparatus; and control means responsive to said signal generated by said comparison means for enabling operation of said apparatus if said signal generated by said comparison means is a coincidence signal and for disabling said apparatus if said signal generated by said comparison means is a noncoincidence signal, said control means thereby permitting operation of said apparatus only when said memory module means connected to said apparatus is the same before and after the power failure to said apparatus.

2. The apparatus of claim 1, wherein said electronic apparatus comprises a pocket computer.

3. The apparatus of claim 1, wherein said means for generating comprises means for generating random number, time information, or a serial number.

4. The apparatus of claim 1, wherein said means for generating comprises timekeeping circuit means providing current time information.

5. The apparatus of claim 1, wherein said means for generating comprises counter means for providing a value of a serial number.

6. The apparatus of claim 1, further comprising detection means for detecting whether said memory module consists of a read only memory or a random access memory.

* * * * *